July 18, 1961 P. CHERKAS 2,992,620
RETRACTABLE MOUNT
Filed July 12, 1954 3 Sheets-Sheet 1
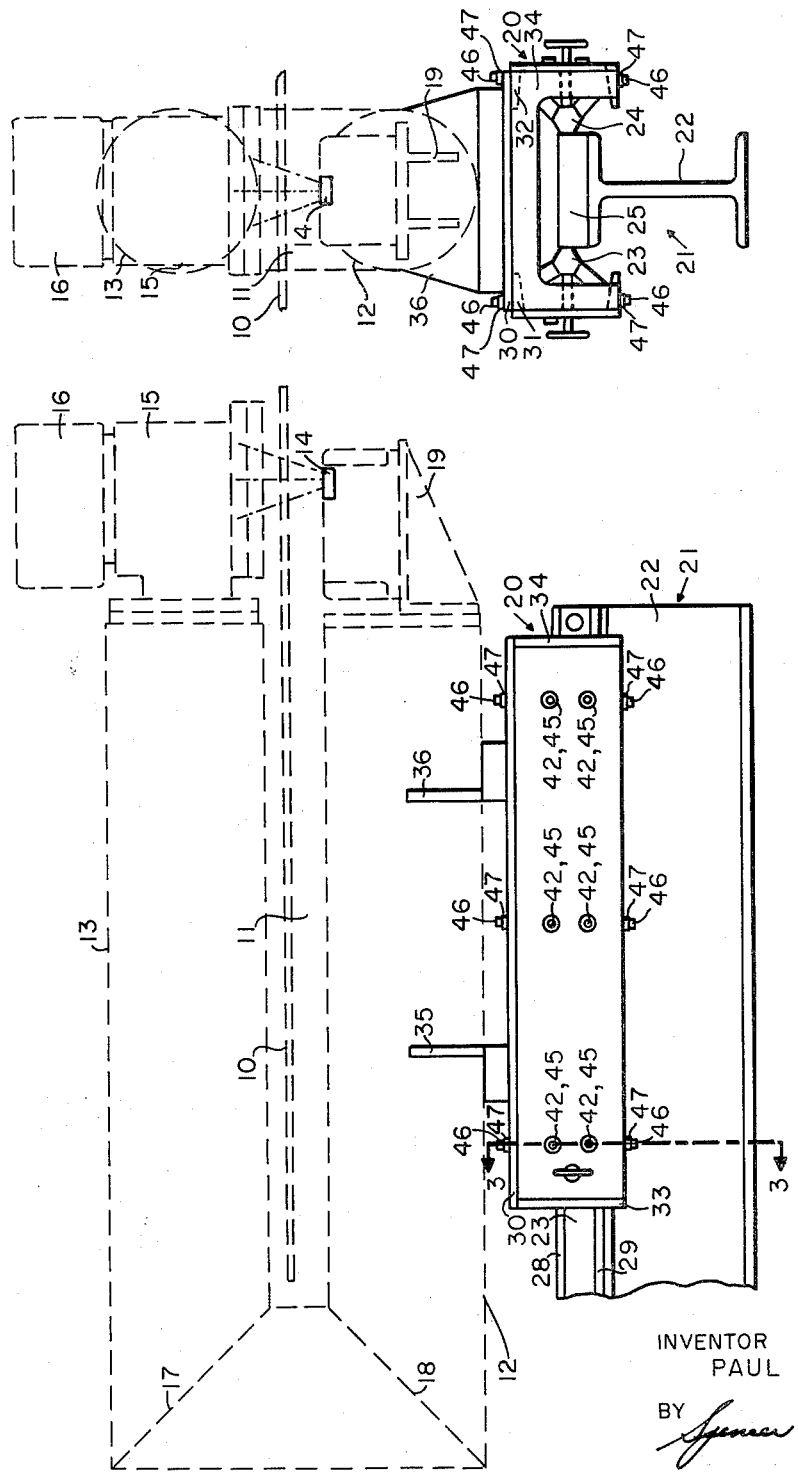
INVENTOR
PAUL CHERKAS
BY
ATTORNEY July 18, 1961

P. CHERKAS 2,992,620

RETRACTABLE MOUNT

Filed July 12, 1954

INVENTOR
PAUL CHERKAS
BY
*Spencer E. Olson*
ATTORNEY

July 18, 1961  P. CHERKAS  2,992,620
RETRACTABLE MOUNT
Filed July 12, 1954  3 Sheets-Sheet 3

INVENTOR
PAUL CHERKAS
BY
ATTORNEY 2,992,620
Patented July 18, 1961

2,992,620
RETRACTABLE MOUNT
Paul Cherkas, Malden, Mass., assignor to Tracerlab, Inc., Boston, Mass., a corporation of Massachusetts
Filed July 12, 1954, Ser. No. 442,654
4 Claims. (Cl. 104—119)

This invention relates to thickness gauges of the radiation type and more particularly to a track and carriage arrangement for movably supporting the measuring head of such equipment.

Radiation-type thickness gauges are of two general types, namely, those operating on the absorption principle, and those which give an indication of thickness by the degree of backscattering of radiation, e.g., beta rays, from the material under examination. In the absorption type of gauge, a source of penetrative radiations is disposed on one side of a material to be measured and a detector yielding an output current which is a function of intensity of incident radiation is placed on the other side thereof, opposite the source. Radiations are absorbed by the material in a manner now well known in the art, the degree of absorption being a measure of the weight per unit area of such material, and where the density is uniform, the gauge may be calibrated directly to indicate thickness. In the usual absorption gauge, the source and detector are mounted at the extremities of the lower and upper arms, respectively, of a C-shaped frame, through the throat of which the material to be measured, usually in sheet form, is passed. As sheet material made by conventional industrial processes has a variety of widths, up to six or eight feet, for example, it will be apparent that in order that the spacing between the sources and detector be maintained (a criteria necessary for proper operation), particularly when the gauge is subjected to appreciable vibration, the C-frame must be extremely rigid, and to achieve this end, the arms of the C-frame are necessarily bulky and heavy. If the gauge were to be permanently installed on a process line, this feature would not be objectionable, but inasmuch as a substantially point source of radiation is used, it is necessary to move the measuring head across the width of the material. Moreover, in the standardization or calibration of the gauge, it is necessary to remove the sheet material from between the source and detector, and inasmuch as the material is normally produced by a continuous process which cannot be interrupted, it is necessary to retract the C frame so that the source and detector are completely clear from the edge of the sheet.

In the back-scatter type of gauge, the source of radiations and the detector are mounted on the same side of the material being measured, the intensity of the scattered radiation being proportional to the weight per unit area of the scattering material. Gauges of this type are employed when the process line does not permit accessibility of the C-frame described above, and finds particular applicability in the measurement of the thickness of sheet material as it passes over a calender roll, such as are found in the paper, rubber or plastic industries. In general, the structural support for the backscatter measuring head is much lighter in weight than the C-frame used in the absorption gauge as the head consists only of the source and an ionization chamber, but since the accuracy of the gauge is extremely sensitive to variations in the spacing between the measuring head and the material under test, it is very important accurately to maintain this spacing, particularly when the head is scanned across the width of the sheet. Achievement of this requirement is complicated in calender applications due to the crown on the calender roll, for if the measuring head is caused to traverse the sheet on a straight track, while the sheet is in contact with the roll, the variation in spacing introduced by the crown, although slight, is sufficient to destroy the effectiveness of the gauge.

In the case of the C-frame mounting, where curvature is not a problem, a machined carriage and bed, of the general type used in lathes and other comparable machine tools, could be used to permit movement of the source and detector across the sheet material, but the manufacture of such equipment involves extremely costly machining operations, and the weight of the C-frame, especially in the larger sizes, would introduce objectionable friction between carriage and bed. While the gauge is normally mounted with the arms of the C-frame in the same vertical plane, some installations require that the frame be tilted from the vertical. Such positioning obviously introduces an undesirable distribution of weight, and a machined bed would have to be T-slot construction, or equivalent, to retain the carriage on the bed, a most expensive fabrication, and the friction problem would be greatly aggravated.

The machining problem is further complicated in the backscatter gauge mount since it is practically impossible to machine a bed having a curvature corresponding to the crown of the calender roll, and obviously would be prohibitively expensive, particularly with long rolls. Moreover, since there is no uniformity in the crown of calender rolls from one industry to another, each carriage and track would necessarily be custom made, further adding to the unit cost of the apparatus.

With an appreciation of the foregoing problems, applicant has a primary object of his invention to provide an easily retractable mount of simple and inexpensive construction.

Another object of the invention is to provide a retractable mount which is readily movable by hand while supporting appreciable weight.

A further object of the invention is to provide a track and carriage system in which curvature in the track may be easily introduced.

Another object is to provide a track and carriage system in which the curvature of the track may be adjusted after installation.

A still further object of the invention is to provide a track and carriage system having a minimum of friction.

Still another object of the invention is to provide a track and carriage system in which the carriage is held on the track regardless of the attitude of the system while still maintaining ease of movement with reasonable precision.

In the attainment of the foregoing objects, the track of the invention comprises a pair of parallel members formed of cold rolled bar stock, as received from the mill, secured to a suitable frame to provide the necessary rigidity. The frame may be a length of channel iron, or an I-beam, likewise utilized in the form received from the steel mill. The track members are preferably formed of hexagonal stock to provide flat bearing surfaces. The carriage consists of a box-like frame constructed to fit over the track and including therein a plurality of ball bearings, arranged to contact the bar stock tracks. In a preferred embodiment, the track members are formed of hexagonal stock, and the carriage includes eight bearings, four at each end, obliquely mounted in the carriage such that the rolling surface of the bearings are normal to selected faces of the hexagonal members. The bearings are arranged to cooperate in keeping the carriage firmly in contact with the running surfaces of the track at all times whether or not the plane defined by the tracks is horizontal.

Another feature of the invention consists in securing the track members to the opposite ends of distributed spacer rods, which in turn, are adjustable relative to the supporting frame. The track members are sufficiently flexible that by proper adjustment and setting of the transverse position of successive spacer rods, both tracks may be similarly curved to an extent to correspond with the normally encountered crown of a calender roll. Transverse adjustment of the spacer-rods is accomplished by a simple, readily accessible turnbuckle arrangement associated with each spacer-rod, thus permitting rapid adjustment of track curvature after installation.

The invention will be more clearly understood, and other objects, features and advantages thereof will become apparent from the following detailed description taken in conjunction with the accompanying drawings in which:

FIG. 1 is a side elevation view, partially in phantom, of the track and carriage of the present invention shown as supporting a C-frame of an absorption-type thickness gauge;

FIG. 2 is an end elevation view, partially in phantom, of the track, carriage and C-frame as viewed from the right side of FIG. 1;

Figure 3:
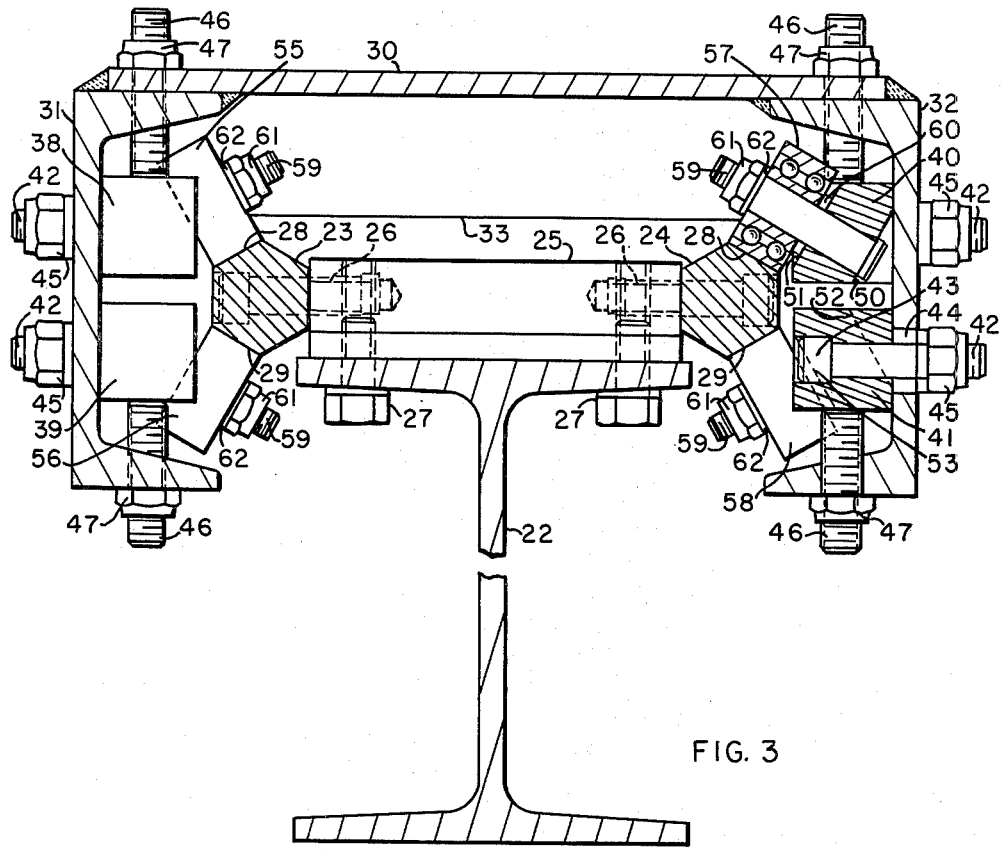
FIG. 3 is a cross-sectional view taken along section-line 3—3 of FIG. 1.

Referring to FIGS. 1 and 2 of the drawings, there is illustrated, in phantom, a typical arrangement of an absorption-type thickness gauge with which the present invention finds particular utility. A sheet of material 10 the thickness of which is to be measured, is passed through the throat region 11 between the arms 12 and 13 at the extremities of which are respectively mounted a source 14 of penetrative radiations, e.g., beta rays, and a radiation detector, such as an ionization chamber 15. Radiation from source 14 passes through the material 10, which may be steel, rubber, plastic, fabric, or the like, a certain amount being absorbed depending on the weight per unit area of the material. With a known source strength, the amount of radiation transmitted, as indicated by the ionization current produced in ionization chamber 15, is also related to the weight per unit area. The ionization current is amplified in a pre-amplifier 16, and when the density of the material is known, may be utilized in auxiliary equipment (not shown) to indicate the thickness of sheet 10. The material 10 is normally produced by a continuous process and may be fed through the gauge at speeds of the order of 50 to 2000 feet per minute. For proper operation of the gauge, the spacing between source 14 and chamber 15 must be closely maintained, and inasmuch as arms 12 and 13 must be of the order of six to eight feet in length to receive sheet materials commonly encountered, it is necessary that these arms, especially the cantilever arm 13, be very rigid. While the requisite rigidity may be achieved with a variety of structural members, it has been found that adequate stability may be obtained, with a minimum of weight, by fabricating the C-frame from steel tubing of suitable diameter, welded together as at 17 and 18. Even with this attempt at weight reduction, an 80-inch C-frame of requisite rigidity, not an uncommon size, together with the mounting structure 19 for the source, chamber 15 and preamplifier 16 weighs approximately 600 pounds.

If the gauge could be permanently mounted on the process line, this weight would not be particularly objectionable, but in view of the substantially point source of radiation 14, only a narrow strip of the sheet 10 would be gauged as it is passed through the equipment.

Inasmuch as variations in thickness may exist across the width of the sheet 10, which are desirably measured, the C-frame must be moved transversely of the sheet. Moreover, gauges of this type must be periodically standardized, a procedure which requires removal of the material 10 from between the source 14 and detector 15, and inasmuch as the sheet manufacturing process cannot normally be interrupted, the C-frame must be retracted from the sheet.

To permit ease of movement of the relatively heavy C-frame transversely of sheet 10, the present invention contemplates securing the frame on a carriage 20, which in turn is movably mounted on a supporting frame and track assembly 21. The supporting frame preferably consists of a length of I-beam 22 of suitable cross-section to have the requisite rigidity, supported from the floor or otherwise (by means not shown) in a position parallel to sheet 10 and at a height such that when the carriage 20 and C-frame are mounted thereon, the pass-line of sheet 10 is properly positioned between source 14 and detector 15. The frame 22 is of sufficient length to permit movement of the measuring head from the position shown in FIG. 1 to a position where the gauge is clear of the left-hand edge of sheet 10.

Figure 5:
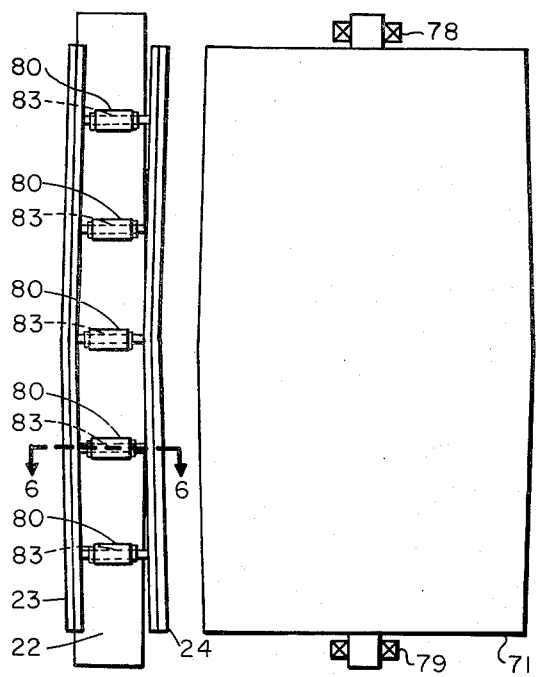
FIG. 5 is a plan view of a crowned calender roll and the track for supporting the gauge of FIG. 4.
Figure 6:
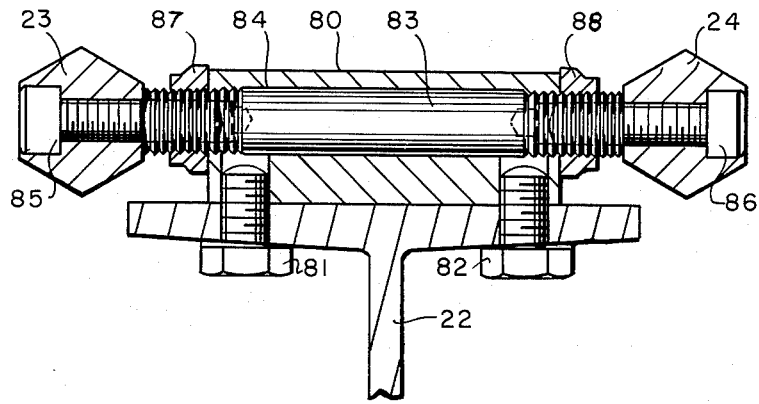
FIG. 6 is an elevation cross-section view taken along the line 6—6 of FIG. 5.

As can best be seen in FIGS. 3 and 5, the track comprises a pair of hexagonal bar stock members 23 and 24, secured to the upper flange of I-beam 22 and substantially coextensive therewith. Members 23 and 24 are preferably secured to the opposite ends of a plurality of equal length spacer-bars 25, as by lag bolts 26, the heads of which are counter-sunk to avoid interference with the carriage. The spacer-bars 25 are secured to the upper flange of the I-beam, symmetrically with the center-line thereof, with a pair of lag bolts 27, 27, the spacer-bars being sufficiently close together to insure suitable rigidity of the hexagonal members. For the weights mentioned above, and using one-inch hexagonal stock, a spacing of about one foot between adjacent spacer-bars has been found to be satisfactory. The hexagonal stock, which may be used in the condition in which it is received from the rolling mill, is secured to the spacer bars with one face thereof in contact with the end face of the spacer bar, thereby leaving five exposed surfaces, two of which, on each member, namely, 28 and 29, are utilized as bearing surfaces in the present arrangement. Thus, four longitudinal bearing surfaces are provided, the track being straight when all of the spacer bars are similarly disposed relative to supporting frame 22, and if desired, capable of being curved to some extent, as will be fully described hereinafter in connection with FIGS. 5 and 6.

The carriage of the present invention comprises a box-like housing formed of structural steel of suitable cross-section to carry the weights involved, and may include plate 30 to the edges of which and depending therefrom are welded two pieces of channel iron 31 and 32. The ends of the carriage are partially closed, as by U-shaped plates 33 and 34 (FIG. 1) welded to the opposite ends of members 30, 31 and 32. The C-frame of the thickness gauge is supported on the plate 30 by a cradle formed of gussetts 35 and 36, secured as by welding to arm 12 of the C-frame and to plate 30, the C-frame being oriented such that the center of gravity thereof is substantially equidistant the ends of the carriage.

To the inner surface of the channel members 31 and 32 and coextensive therewith, are respectively secured two pieces of rectangular bar stock 38 and 39 and 40 and 41. Each of the latter members is secured by a plurality of bolts 42, the heads 43 of which are countersunk in the internal face of the member, the shanks of which pass through openings 44 of somewhat larger diameter to permit slight adjustment of members 38, 39, 40 and 41 in the vertical direction, and the nuts 45 of which are turned up against the outer faces of members 31 and 32. To provide more positive positioning of members 38, 39, 40 and 41 than is afforded by bolts 42, there are provided twelve lockable adjusting screws 46, three being threaded through the lower flange of each of channel members 31 and 32 to engage the under surface of members 39 and 41, and three being threaded through the upper flange of each of members 31 and 32 to engage the upper surface of members 38 and 40. Each of adjusting screws 46 is locked in its adjusted position by a lock-nut 47.

As best shown in the section of member 40, each of members 38, 39, 40 and 41 has its opposite corners milled off for a small portion of its length, to provide flat surfaces 50 and 51 which are oriented perpendicular to the bearing surface of the hexagonal track with which it is associated. Thus, surfaces 50 and 51 are perpendicular to surface 28 of member 24, surfaces 52 and 53 are perpendicular to surface 29 of member 24, and so on. These flats are provided on members 38, 39, 40 and 41 at two positions along the length of the carriage, one near the left end of the carriage (as at section line 3—3 of FIG. 1) and the other near the right end of the carriage.

The carriage is supported and maintained on the track by eight thrust ball bearings, four of which, namely, 55, 56, 57 and 58 are shown in FIG. 3, the other set of four being similarly disposed near the right end of the carriage (FIG. 1). As shown in the upper right hand portion of FIG. 3, each bearing (in this case, 57) is secured to its respective rectangular member (in this case, 40) at the position of the flats, by a shaft 59, the head of which bears against the surface 50. The bearing is separated from surface 57 by annular spacer 60, and the inner race is locked to shaft 59 by tightening nut 61 against washer 62. Thus, it is seen that the outer race of bearings 55 and 57 (and the corresponding bearings at the other end of the carriage) are normal to the oblique upper surfaces 28 of tracks 23 and 24, and bearings 56 and 58 are normal to the oblique under surfaces 29 of the tracks.

In the attachment of carriage 20 to the track, the carriage is slipped over one end of the track and the upper bearings 55 and 57 adjusted in position such that the bearings are in full contact with the bearing surfaces 28 and thereafter the lower bearings are brought up to the other bearing surface 29. The bearings each being normal to its respective bearing surface, the contacting force of each bearing has components normal to and parallel to the plane defined by the track members 23 and 24, the vectors of the contacting forces of bearings 55 and 57 on the upper surfaces 28 of tracks 23 and 24 intersecting below the plane of the tracks and intermediate the track members, and the vectors of the contacting forces of bearings 56 and 58 on the under surfaces 29 of tracks 23 and 24 intersecting at a point above and between the track members. Stated another way, the contacting force of bearing 55 on surface 28 of track member 23 is parallel and opposite to the force of bearing 58 on surface 29 of track 24, and the contacting force of bearing 57 on surface 28 of member 24 is parallel and opposite to the contacting force of bearing 56 on surface 29 of member 23, each of these contacting forces having an inwardly directed component and a component normal to the plane defined by the track members. Thus, any tendency of the upper bearings to run off their bearing surfaces is counteracted by the lower bearings, and even if the I-beam 22 is rotated about its longitudinal axis, such that the C-frame lies in a horizontal plane, the carriage will be retained on the track except that the distribution of forces between the bearings will be different. In spite of the relatively firm contact of the bearings with the bearing surfaces 28 and 29, and the weight carried by the carriage, the carriage moves freely along the track and can easily be moved by hand.

It is emphasized, in passing that the fabrication of the track and carriage involves a minimum of machining operations. The I-beam 22 and hexagonal tracks 23 and 24 are used just as they are received from the rolling mill (except for the drilling and tapping of necessary holes). Spacer bars 25 are simply cut from rectangular bar stock, and the housing involves only the welding together of rough plate and channel iron. Thus, apart from the drilling and tapping of holes, relatively inexpensive operations, the only machining required is the milling of the flats on members 39, 40, 41 and 42 at the point of connection thereto of the bearings, this, too, being a simple operation. Consequently, the track and carriage can be fabricated by unskilled machinists at a relatively low cost.

Figure 4:
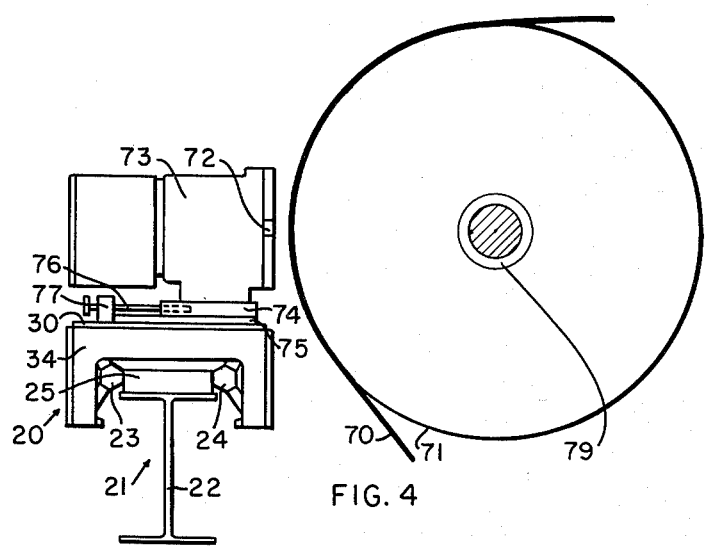
FIG. 4 is an end elevation view of the track and carriage shown supporting a measuring head of the back-scatter type adjacent a calender roll.

Referring now to FIG. 4, there is illustrated a typical arrangement of a backscatter type of thickness gauge as it might be employed in measuring the weight per unit area of a sheet of material 70 as it passes over a calender roll 71. The gauge consists generally of a source of radiation 72 and an ionization chamber 73, both disposed on the same side of the material to be measured, the source being suitably shielded to prevent direct radiation from the source entering the chamber. The intensity of the radiation back-scattered by the material 70 is proportional to the weight per unit area of the material, and accordingly, the ionization current produced in chamber 73 may be recorded as a measure of thickness of the material.

The source and detector are mounted on a carriage and track generally of the construction described above, and preferably arranged for sliding movement transversely of the carriage to permit adjustment of the spacing between the chamber 73 and the material under test. To this end, chamber 73 is welded to plate 74 which is slidable on base plate 75, which in turn is welded to the top plate 30 of the carriage housing, transverse movement being under the control of a screw 76 threaded into plate 74 and anchored in a post 77, also secured to plate 30. For proper operation, the gauge is positioned close to the material, approximately ½ inch away, the accuracy of the gauge being extremely sensitive to small variations in this spacing. Thus, as will be apparent from FIG. 5, if the spacing is properly set at one end of a crowned calender roll, the spacing will gradually decrease and then increase as the gauge is scanned across the roll.

To overcome this deficiency, the invention further contemplates a construction of the track, as above described, such that both tracks may be conveniently curved to conform with the crown of the roll, such that as the carriage is moved therealong, the same spacing is maintained between the gauge and material throughout the scanning traverse. Referring to FIG. 5, there is illustrated a calender roll 71, with the crown greatly exaggerated for clarity, mounted to be rotated on bearings 78 and 79 by suitable driving means (not shown). The track constructed in accordance with the invention is spaced from the roll a suitable distance with the longitudinal axis of I-beam 22 disposed parallel to the rotational axis of roll 71. The hexagonal track members 23 and 24, instead of being rigidly secured to the I beam, as in FIG. 3, are adjustedly mounted thereon and arranged such that the axes thereof may be shifted slightly in either direction from their normal positions equidistantly from the longitudinal axis of the I-beams. This adjustability is obtained through the utilization of a plurality of spacer bars 80, formed of rectangular bar stock of length somewhat less than the spacing between track members 23 and 24, distributed along the length of the I-beam and rigidly secured thereto by lag bolts 81, 82, with their ends equidistant from the center line of the upper flange of the I-beam. A spacer rod 83, preferably formed of round bar stock and of a length equal to the desired spacing between tracks is inserted through an opening 84 in each of spacer bars 80, to the opposite ends of which the track members are secured by lag bolts 85 and 86. Spacer-rods 83 are externally threaded on each end and nuts 87 and 88, threaded thereon and arranged to be tightened against the respective end faces of spacer bar 80. If a straight track is desired, nuts 87 and 88 are all adjusted to position the opposite ends of all the spacer-rods equidistant from the longitudinal axis of the I-beam 22. On the other hand, curvature in the track members may be introduced by transversely shifting successive spacer-rods relative to its respective spacer-bar by proper manipulation of nuts 87 and 88. For example, the central portion of the track (FIG. 5) may be shifted to the left by loosening nut 88 and tightening nut 87 to displace rod 83 the desired amount, yet maintaining the proper spacing between the track members, nut 88 thereafter being again tightened rigidly to secure the spacer-rod and spacer-bar together. Similarly, if it is necessary to shift the track to the right, as for example the end sections of the track of FIG. 5, nut 87 is loosened and nut 88 tightened to move the spacer rods the desired amount.

With the spacer-rods 83 being thus capable of individual adjustment relative to spacer-bars 80, I-beam 22 may be positioned relative to calender roll 71 to give roughly the spacing required, and then the individual spacer-rods adjusted relative to its respective spacer-bar. The hexagonal stock being susceptible to some flexing, it is possible to introduce a uniform curvature in tracks 23 and 24 which conforms with the crown of the calender roll. The above-described construction of the carriage insures that it will follow slight curvatures of the track, and accordingly, the spacing between the gauging head (secured to the carriage) and the calender roll is accurately maintained during scanning across the roll.

The above-described feature of transverse adjustability, while it is particularly useful for the introduction of a predetermined amount of curvature into the track members, may also be used to advantage to obtain an absolutely straight track. For example, in the construction illustrated in FIG. 3, slight differences in the lengths of successive spacer bars 25, or minor deviations of their positions from the center line of I-beam 22, or slight curvature of the I-beam, would result in track members 23 and 24 having unwanted deviations from straightness along their length. Such irregularities may be compensated for to provide a perfectly straight track through the use of the arrangement of FIG. 6, it being necessary only to insure that all spacer rods 83 are of the same length since other irregularities of the type referred to can be overcome by careful adjustment of the spacer-rods relative to spacer-bars 80.

Figure 7:
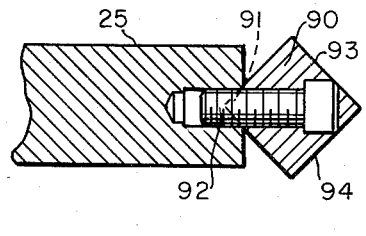
FIGS. 7 and 8 are fragmentary cross-section views illustrating alternate forms of the track members.
Figure 8:
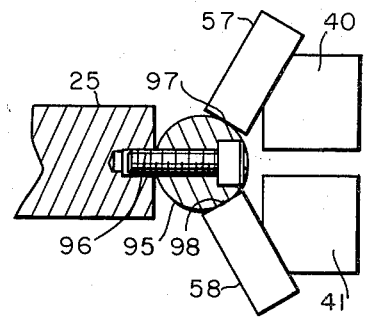

While the described embodiment employing hexagonal stock as the track members is preferred because of the ease of attachment to the spacer-bars and the provision of flat bearing surfaces properly oriented, it will of course be understood that the track may be formed of bar stock of other cross-sections. For example, as shown in FIG. 7, the track 90 may be formed of square bar stock with one corner 91 milled off for suitable attachment to the ends of spacer-bar 25, as by lag bolts 92. This arrangement provides two oblique bearing surfaces 93 and 94, so disposed relative to each other, that a carriage of substantially the construction described above can be used therewith with the same advantages. As another alternative, the track members may be formed of circular bar stock, secured to the ends of spacer bars 25. As shown in FIG. 8, the circular member 95 is secured to the end of the spacer bar 25 as by lag bolts 96, and due to the rigid orientation of the bearings within the carriage, they make firm contact with the track 95 at angularly spaced points 97 and 98, and the carriage is maintained on the track by the coaction of forces of the bearings on the two tracks. Only line contact between bearing and track is provided when circular stock is used, but this is not particularly objectionable, especially when relatively light loads are involved.

While there have been shown and described and pointed out novel features of the invention as applied to a preferred embodiment, it will be understood that the track and carriage may find application elsewhere than in the thickness gauge field, and that various omissions and substitutions and changes in form may be made by those skilled in the art without departing from the spirit of the invention. It is applicant's intention, therefore, to be limited only as indicated by the scope of the appended claims.

What is claimed is:

1. In combination, an elongated rigid supporting member, a plurality of equal length spacer rods distributed along the length of said member and supported transversely thereon, a pair of elongated, parallel track members disposed parallel to said support member and respectively secured to opposite ends of said spacer rods, each of said track members having first and second planar bearing surfaces disposed on opposite sides of the plane defined by longitudinal axes of said track members, said first bearing surface on one of said track members being parallel to said second bearing surface on the other of said track members, said second bearing surface on said one track member being parallel to said first bearing surface on said other track member, means cooperative with said spacer rods and said supporting member for individually adjusting the transverse position of said spacer rods relative to the longitudinal axis of said supporting member, a housing having a plurality of bearing means rigidly secured therein obliquely to the plane defined by the longitudinal axes of said track members, each of said bearing surfaces on both of said track members being operatively contacted respectively by at least two of said plurality of bearing means, the contacting forces of the bearing means on said first bearing surface of one of said track members being parallel and opposite to the contacting forces of the bearing means on said second bearing surface of the other of said track members, and vice versa.

2. Apparatus of the character described comprising, in combination, a rigid elongated supporting member, a plurality of equal length spacer rods adjustably secured to said supporting member transverse to the longitudinal axis thereof, a pair of elongated and parallel track members disposed parallel to the longitudinal axis of said support member and respectively secured to opposite ends of said spacer rods, said track members being formed of flexible bar stock and arranged each to provide first and second planar and outwardly directed bearing surfaces oriented obliquely to the plane defined by the longitudinal axes of said track members and on opposite sides of said plane, means for individually adjusting said spacer rods in either direction transversely of the axis of said supporting member for introducing curvature in said track members, a housing having a plurality of bearings adjustably secured therein, each of said bearing surfaces being contacted perpendicularly by at least two of said plurality of bearings at spaced apart points whereby said housing is arranged for movement along the longitudinal axis of said support member, the contacting forces of the bearings on said bearing surfaces being directed inwardly and having a component normal to said plane defined by said longitudinal axes of said track members.

3. In combination, an elongated rigid supporting member, a plurality of equal length spacer rods distributed along the length of said member and secured transversely thereon, a pair of uniformly spaced flexible elongated and parallel track members disposed parallel to said support member and respectively secured to opposite ends of said spacer rods, said track members each having first and second planar bearing surfaces disposed on opposite sides of the plane defined by the longitudinal axes of said pair of track members, the normal to each of said bearing surfaces being directed inwardly, means for individually adjusting the transverse position of said spacer rods transversely of the longitudinal axis of said supporting member for introducing curvature in said track members while retaining said uniform spacing therebetween, and a carriage including a plurality of bearing means arranged in fixed relationship to each other, each of said bearing surfaces being contacted perpendicularly by at least two of said plurality of bearings at spaced apart points whereby said carriage is arranged for movement along the longitudinal axis of said support member.

4. In combination, an elongated rigid supporting member, a plurality of spacer bars each having a longitudinal opening therethrough distributed along the length of said member and secured transversely thereon, a like plurality of equal length spacer rods of greater length than said spacer bars adjustably fitted in the openings in said spacer bars, a pair of substantially parallel flexible elongated track members respectively secured to the opposite ends of said spacer rods, said track members each having first and second planar bearing surfaces oriented obliquely to the plane defined by the longitudinal axes of said track members and on opposite sides of said plane, means for individually adjusting said spacer rods in either direction transversely of the axis of said supporting member for introducing curvature in said track members while maintaining said parallelism of said track members, and a carriage including a plurality of bearing means arranged in fixed relationship to each other, each of said bearing surfaces being contacted perpendicularly by at least two of said plurality of bearings at spaced apart points whereby said carriage is arranged for movement along the longitudinal axis of said support member.

References Cited in the file of this patent

UNITED STATES PATENTS

| | | |
|---|---|---|
| 891,882 | Valentine | June 30, 1908 |
| 1,357,941 | Bielawski | Nov. 9, 1920 |
| 1,461,322 | Maynes | July 10, 1923 |
| 1,654,280 | Cavagna | Dec. 27, 1927 |
| 1,731,258 | Mortka | Oct. 15, 1929 |
| 1,749,381 | Huebsch | Mar. 4, 1930 |
| 2,660,128 | Hayes | Nov. 24, 1953 |
| 2,761,395 | Peck | Sept. 4, 1956 |
| 2,769,097 | Lord | Oct. 30, 1956 |
| 2,800,590 | Gilman | July 23, 1957 |